United States Patent [19]

Rosenstiel et al.

[11] 4,424,148

[45] Jan. 3, 1984

[54] PROCESS FOR PREPARING WASTES FOR NON-POLLUTANT DISPOSAL

[75] Inventors: Terry L. Rosenstiel, Mount Prospect; Allen A. G. Debus, Northbrook, both of Ill.

[73] Assignee: United States Gypsum Company, Chicago, Ill.

[21] Appl. No.: 235,052

[22] Filed: Feb. 17, 1981

[51] Int. Cl.³ .............................................. C09K 11/04
[52] U.S. Cl. ..................................... 252/628; 106/116
[58] Field of Search ........................... 252/628; 106/116

[56] References Cited

U.S. PATENT DOCUMENTS

| | | | |
|---|---|---|---|
| 3,988,258 | 10/1976 | Curtiss et al. | 252/628 |
| 4,167,491 | 9/1979 | Gablin et al. | 252/628 |
| 4,174,293 | 11/1979 | Colombo et al. | 252/628 |
| 4,230,597 | 10/1980 | Bustard et al. | 252/628 |
| 4,354,954 | 10/1982 | Koster et al. | 252/629 |

OTHER PUBLICATIONS

Bill Meyer, Jr., Textbook of Polymer Chemistry (1957) pp. 351–353.

*Primary Examiner*—Brooks H. Hunt
*Attorney, Agent, or Firm*—Robert H. Robinson; Kenneth E. Roberts; Samuel Kurlandsky

[57] ABSTRACT

A method of disposing of wastes, especially wastes containing radioactive or toxic substances, such as the wastes generated in the water associated with nuclear power production is described. A feature of the invention is to incorporate the waste into a hardenable setting mass when mixed with water, comprising calcium sulfate hemihydrate, water soluble melamine formaldehyde resin which when cured is hydrophobic, and a cross-linking agent for curing the resin.

14 Claims, No Drawings

PROCESS FOR PREPARING WASTES FOR NON-POLLUTANT DISPOSAL

BACKGROUND OF THE INVENTION

1. Field of the Invention

This invention relates to a process for preparing solid wastes containing hazardous substances such as radioactive or toxic substances for safe, non-pollutive handling, transportation and permanent storage; the fluid solids being brought into contact with water if they are not aqueous dispersions, suspensions or solutions and then being brought into contact with a water-settable and hardenable mixture and left to harden into solid masses. The invention particularly relates to disposal of radwaste associated with nuclear power production processes.

Radioactive or toxic solid wastes accumulate in various industrial processes, especially in the nuclear industry; and such wastes must be treated to prevent contamination of the biocycle during storage, transportation and final disposal. In conventional nuclear power producing facilities, coolant waters acquire radioactively-contaminated dissolved and particulate impurities. Other liquids or solids are contaminated through other operations therein such as wet spent ion-exchange resin beds from filtering low level aqueous wastes; aqueous evaporator concentrates and sludges; and radiated waste oil from machinery.

Low level radioactive wastes, commonly referred to as "radwaste" accumulates in a legion of ways and forms in industrial processes. Radwaste in liquids or finely divided solid form from the operation of nuclear power generation occurs as contamination of the coolant streams; aqueous evaporator precipitation sludges and the like that are not only radioactive but widely variable in pH and solids/solute composition. Radiated waste oil from machinery and spent ion-exchange resin beads from filtering low level aqueous wastes add to the diversity. Ash from incineration of radwaste, while reducing bulk, must still itself be dealt with as a radwaste. In other areas for example, spent scintillation fluids associated with radioactive counting in the research and medical fields must be treated to prevent contamination of the biocycle during temporary storage; transport and final disposal.

Even where associated wastes have been freed from consideration as radwaste due to very low levels of radioactivity, the usual solutes, such as dioxane or toluene are still the subject of concern to other areas of hazardous waste materials regulation due to toxicity.

These waste streams are so widely variable as to amounts and types of particulates/solutes and amount of them which can be placed in containers due to varying radioactivity or other hazard level that vexacious disposal problems are presented. Other disposal problems are presented by waste materials other than radioactive substances such as the toxic wastes discussed above and heavy metal wastes as from various industrial chemical operations.

2. The Prior Art

The disposal of liquid or finely divided solid radwaste substances by solidification with various binders into containers for subsequent burial is well established in the art.

Plaster of Paris has been used by research laboratories in solidifying small quantities of aqueous radwaste into e.g. quart cartons for inclusion in large drums with dry, low level trash such as waste paper, gloves, rubbers, clothing, etc., and disposed of in low level radioactive waste disposal sites. It has not been used to solidify radwaste in large containers because of controversy over leachability.

Portland cement has been in widespread prior usage for mixing in the usual water-cement ratio to solidify some aqueous radwastes in a large quantity. Such disposal has a number of disadvantages. One resides in the limited cement: water ratio which limits the amounts of some radwaste due to weight of the cement. More serious disadvantages include that Portland cement exhibits considerable shrinkage upon set so disposal drums must be re-opened and top filled; previous attempts to solidify neutralized acidic wastes such as borated salt evaporator bottoms radwaste, and highly acidic resin beads have been relatively unsuccessful because of chemical intolerance and unsatisfactory set of the cement. Further, Portland cement will not readily hold organic fluids.

Polymers such as urea-formaldehyde resins and modified vinyl esters have been used to solify radwastes in large containers. Reaction stoichiometry must be carefully controlled; acidic catalysts may be necessary, causing container deterioration; the materials are expensive; the bound material is frequently flammable; and some require heat to initiate curing.

Subsequently impregnating a set Portland cement solidified mass with a monomer and polymerization catalyst to avoid leachability of the cement is shown in U.S. Pat. No. 4,174,293. Similarly published U.K. application GB No. 2000 460A talks of binding waste with gypsum and encapsulating with a polyester resin.

Combining an alkali or alkaline earth metal silicate with Portland cement fo encapsulating aqueous radwaste is shown in U.S. Pat. No. 3,988,258.

Combining Portland cement and either a bitumen, polyvinyl chloride, polyethylene or polystyrene for encapsulating fluid radwastes is shown in German unexamined patent specification OS No. 23 56 253 laid open May 22, 1975. It further avers that plaster might be used as the binder. Finally PCT publication WO No. 801 00047 discloses encapsulating a hazardous waste with a mixture of unsaturated polyester, ethylenically unsaturated monomer, polymerization initiator and hydraulic filler.

SUMMARY OF THE INVENTION

An object of the invention is to provide a process for disposing of hazardous waste materials in which improvements are made over use of the materials described hereinabove; and moreover provides an inexpensive binder material, usable on a wide variety of variable wastes and in general providing reliable disposal.

According to the present invention a process is provided for preparing hazardous waste substances such as toxic wastes pollutive wastes and radwastes for containerized storage, transport and final disposition in which liquid or finely divided solid fluid wastes are mixed with a binder and water and allowed to set to a hardenable mass characterized by combining as setting, hardenable binder mass when mixed with water, about 90–60 weight percent calcium sulfate hemihydrate; about 10–40 weight percent water dispensible melamine formaldehyde resin which when cured is hydrophobic; and an amount sufficient to cure the resin of a cross-linking agent for the resin. Such binder is mixed with water, conveniently provided when the wastes to be treated are in aqueous solution or dispersion form. When the wastes are oil or solvent form an emulsifier is added thereto before mixing with water and binder.

The present invention provides a waste binder formulation using simple inexpensive industrial plasters by which it is possible to successfully bind various aqueous solutions, used oil, solvent and solid materials which represent typical waste products requiring controlled disposal. Not only did these formulations successfully and controllably bind the desired waste products, but they exhibit significantly greater loading capacities than are reported in the laterature for currently used systems. This latter point is particularly beneficial in determining the cost effectiveness of a system when the bound material has to be transported from one place to another. The presently proposed binder systems are lower in cost; non-flammable; non-toxic; non-reactive; expand slightly on set; and offer formulary flexibility for various waste materials. Binder crystallization and cure and weight retention are uniform, controllable and complete for various waste materials.

DESCRIPTION OF THE PREFERRED EMBODIMENTS

The setting agent in the composition which hardens in the presence of water to cause the composition to set is calcium sulfate hemihydrate (plaster of Paris, stucco). The hemihydrate may be any hemihydrate product of conventional batch or continuous calcination from any gypsum source, such gypsum sources being for example high quality natural rock or gypsum derived from chemical processes. Such hemihydrate as beta hemihydrate may further be characterized in generally having a consistency when mixed with water between about and 60 and 90 parts per hundred weight for betahemihydrate. Further where greater strengths are desired alpha hemihydrate may be used, generally characterized in proportions with water of about 30–50 parts per hundred weight.

The melamine resin in the composition is any water dispersible melamine formaldehyde resin which when cured is hydrophobic. Preferably the melamine resin is either in powder form or is in the form of a liquid having a solids content of at least 75% by weight and is completely water soluble at room temperatures; although water dispersable resins may be utilized. Further it is highly preferred that polymeric resin products, manufactured by reacting melamine with formaldehyde in ratios between about 1:2 and 1:4 that is soluble with equal parts by weight of water be used. Such are commercially available from numerous sources such as CYMEL 14 resin from American Cyanamid, RESIMENE 819 resin from Monsanto Chemical Company and PLASKON resin from Allied Chemical Company.

The cross-linking agent is provided in order to promote satisfactory curing of the resin, and serves for cross-linking with the methylol groups on the resin molecules to provide curing of the melamine resin in the presence of water. The cross-linking agents may be any one or more of those well known to the trade such as the water dispersable nitrogen yielding functional compounds including ammonium salts and polyamino compounds such as decyandiamide and guanidine. For reasons of cost and availability, ammonium chloride is preferred. Generally about 1 part by weight of catalyst per 28 parts resin will be used for an 4–5 hour cure although more catalyst may be added for faster cure.

Particularly preferred emulsifiers for use in the present invention are nonionic surfactants that are either oil soluble or water soluble; and particularly preferred ones include non-ionic polyoxyethylene glycol aliphatic soaps of about 8 to 22 carbon atoms such as tallates; and alkylaryl polyether alcohols, sulfonates and sulfates such as polyether alcohols prepared by reacting octylphenol or nonylphenol with 3 to 30 moles ethylene oxide; and especially water soluble nonylphenols having about 10–12 moles of ethylene oxide per mole of nonyl phenol.

The wastes to be bound in accordance with the present invention are highly variable with regard to concentration of hazardous material e.g., radiation level, and concentration that can be tolerated before and after binding; solids content and composition; solute content and composition e.g., aqueous or organic; fluidity that is desired for ease of handling the settable mass before set; and strength of the set mass. These will be more particularly illustrated in the following specific examples. Of course it is to be understood that the examples are by way of illustration and in no way to be construed as limitations on the present invention.

EXAMPLE 1

In the operation of a nuclear reactor it is important that the cooling water be pure and free from particulates; and ion exchange resin filter beds are used for this purpose. The spent resin radwaste is then removed for solidification. Alternately evaporators may be used to decrease the volume of cooling water slurries containing boric acid, and the radwaste from the evaporators must be disposed of. The content of this radwaste depends on the type of reactors; boiling water reactors produce waste high in sodium sulfate, pressurized water reactors produce wastes high in boric acid contents. The sodium sulfate wastes are readily solidified with Portland cement. However the boric acid wastes require extensive pretreatment neutralization before attempted solidification with Portland cement and even then the results are questionable.

Simulated pressurized water reactor boric acid waste streams were formulated at 12% solids, 24% solids and 50% solids levels. A generally preferred binder was formulated to comprise on a weight basis 83% beta calcium sulfate hemihydrate, 16% melamine formaldehyde resin powder that was a trimer of cyanamide made from calcium cyanamide and completely soluble with equal parts by weight of water (CYMEL 412 resin) and 0.6% ammonium chloride.

In one evaluation, 55 gallon fiber drums were filled by adding 345 pounds of boric acid waste stream to the container and slowly metering the binder composition into the waste stream as it was being slowly agitated with an impeller mixer to a mixing consistency of 90 cc. wastestream water per 100 grams of binder formulation. Mixing was terminated 13 minutes after initial binder addition; set occurred 20 minutes after initial binder addition and resin cure occurred within. When the fiberboard was stripped away after 1 week the cast was self-standing, very hard and no free water was visible. After 4 weeks storage no degradation of the cast had occurred.

For additional evaluations the binder and waste stream can be mixed by tumbling the filled 55 gallon drum, by impeller blending in a 200 cubic foot lines on a commercial mobile solidification system; and by blending with a paddle type blender.

The above samples achieved solid monolithic casts with no visible free standing liquid separation and no visible shrinkage or swelling of the set solid mass in the containers.

Aliquot test samples were evaluated for compressive strength and water erosion rates, the later determined by subjecting the sample to a 16 gallon per hour stream of water, with representative results as follow:

| Borated Waste Solids Content: | 12% Solids | 24% Solids | 50% Solids |
|---|---|---|---|
| Compressive strength, at: | | | |
| 1 hour | 836 psi | 698 psi | 313 psi |
| 24 hours | 1466 | 1170 | 725 |
| 2 weeks | 1458 | 1020 | 798 |
| Water Erosion Rate (gms/hr) | 2.13 | 2.63 | 3.09 |

EXAMPLE 2

A common organic solvent radwaste, commonly called "LSC Cocktails", comprise spent blood samples that have been spiked with radioative isotopes in liquid scintillation counting solvents, usually toluene xylene and the like. Disposal sites do not want to receive these materials as liquids for land fill disposal since breach or destruction of the waste container could lad to environmental damage; yet they are difficult to solidify.

In one evaluation various simulated toluene LSC cocktails were blended with a nonionic emulsifier while water and the above preferred binder formulation of Example 1 were slurried; then the two were blended together and allowed to set, with results as follows:

| | Blend #1 | Blend #2 | Blend #3 |
|---|---|---|---|
| Ingredients | | | |
| Toluene LSC Cocktail | 105 cc | 130 cc | 163 cc |
| Emulsifier* | 24 cc | 26 cc | 32 cc |
| Binder Composition | 100 g. | 100 g. | 100 g. |
| Water | 70 cc | 70 cc | 70 cc. |
| Properties | | | |
| Setting Time | 109 minutes | 166 minutes | 255 minutes |
| Observations | Good set | Good set | Good set |
| | No oiling out | No oiling out | No oiling out |
| | High strength | Good strength | Fair strength |

*ETHOFAT 242-25 polyoxyethylene glycol tallate emulsifier from Armak Chemicals, Inc.

In another evaluation, simulated 120 cc aliquot xylene LSC cocktails were emulsified alternatively with polyethyoxy nonylphenol emulsifiers having 9-10, 10 and 12 ethylene oxide units in the ether side chains then solidified by blending with binder slurries of 100 gram aliquots of the preferred binder in Example 1 in 70 cc of water.

EXAMPLE 3

Evaluations were made of typical radwastes from a nuclear power plant that uses pressurized water reactors with all low level aqueous radwastes being filtered through ion exchange resins that are then solidified, with high lime masonry cement for disposal. In addition that plant had radiated waste oil from machinery which they were unable to satisfactorily treat for disposal.

In a first evaluation equal amounts by weight of resin beads (pH 3, 2000 ppm borates) and the preferred powdered binder of Example 1, blended thoroughly with water in proportions of 80 cc water per 100 grams powdered binder, and cast into containers for disposal.

In a second evaluation of 10% by volume of liquid nonionic ethoxylated nonylphenol emulsifier was blended with the waste oil and that was blended with an aqueous slurry of the preferred powdered binder at proportions of 55 cc water and 70 cc oil and emulsifier per 100 grams powdered binder.

A third evaluation was made since in some waste processing operations the sequential blending of separate oil-emulsifier streams and aqueous slurry streams may not be practical. In this evaluation a one-step mixing was tried of the resin beads, waste oil (and 10% volume emulsifier), water and powdered binder in mix proportions of 100 grams beads, 55 cc water and 70 cc oil, each per 100 grams powdered binder. The combined materials were allowed to soak one minute and then blended for three minutes in the container.

All three evaluations produced satisfactory solidifications; no visible separations, expansions or shrinkages were evident and hard monolithic casts were obtained in the containers.

It is apparent from the foregoing that the process of the present invention may be applied to a large variety of different wastes whose physical and chemical properties represent a threat to the environment, whether radioactive, toxic, pollutive or the like. The process is particularly suitable to the treatment of wet particulate radioactive wastes and such wastes in suspension, solution or dispersion in which the solute (organic or aqueous) may vary from about 10 to 99% by weight. Wastes containing toxic materials such as lead, mercury or organochlorine compounds may for example be treated.

We claim:

1. A process for preparing fluid hazardous wastes substances for containerized storage, transport and final disposition in which liquid or finely divided solid wastes are mixed with a binder and water, and allowed to set to a hardenable mass; characterized by combining as a setting, hardenable binder mass when mixed with water:
   about 90–60 weight percent calcium sulfate hemihydrate;
   about 10–40 weight percent water-dispersible melamine-formaldehyde resin which when cured is hydrophobic;
   and an amount sufficient to cure the resin of a cross-linking agent for said resin.

2. The process of claim 1 in which said hardenable binder mass is mixed with water in proportions of about 30 to 100 cc of water per 100 grams of said hardenable binder.

3. The process of claim 1 in which said melamine-formaldehyde resin is soluble in an equal amount by weight of water.

4. The process of claim 1 in which said cross-linking agent is ammonium chloride.

5. The process of claim 1 in which said hemihydrate is beta calcium sulfate hemihydrate and said hardenable binder mass is mixed with water in proportions of about 50–90 cc water per 100 grams hardenable binder.

6. The process of claim 1 in which said hemihydrate is alpha calcium sulfate hemihydrate and said hardenable binder mass is mixed with water in proportions of about 20–50 cc water per 100 grams hardenable binder.

7. The process of claim 1 in which said fluid is an oily waste and wherein a nonionic surfactant is added to the waste in an amount of about 1–15% by volume, said surfactant being a polyethoxy alkylphenol where alkly is aliphatic containing 8–12 carbon atoms and containing an average of 8–15 ethylene oxide units.

8. The process of claim 1 in which said fluid is an organic solvent.

9. The process of claim 1 in which said waste is radioactive waste.

10. A process for binding a fluid organic substance with gypsum comprising the addition of about 1–15%, by volume of the organic fluid, of a nonionic surfactant to a mixture of calcium sulfate hemihydrate and water, said surfactant being a polyethoxy alkylphenol having about 3–30 ethylene oxide units per phenol unit and alkyl is aliphatic containing about 8 to 22 carbon atoms.

11. The process of claim 10 in which the surfactant contains about 10–12 units of ethylene oxide per unit of phenol.

12. The process of claim 11 wherein alkyl is octyl.

13. The process of claim 11 wherein alkyl is nonyl.

14. The process of claim 11 wherein alkyl is tallate.

* * * * *